UNITED STATES PATENT OFFICE.

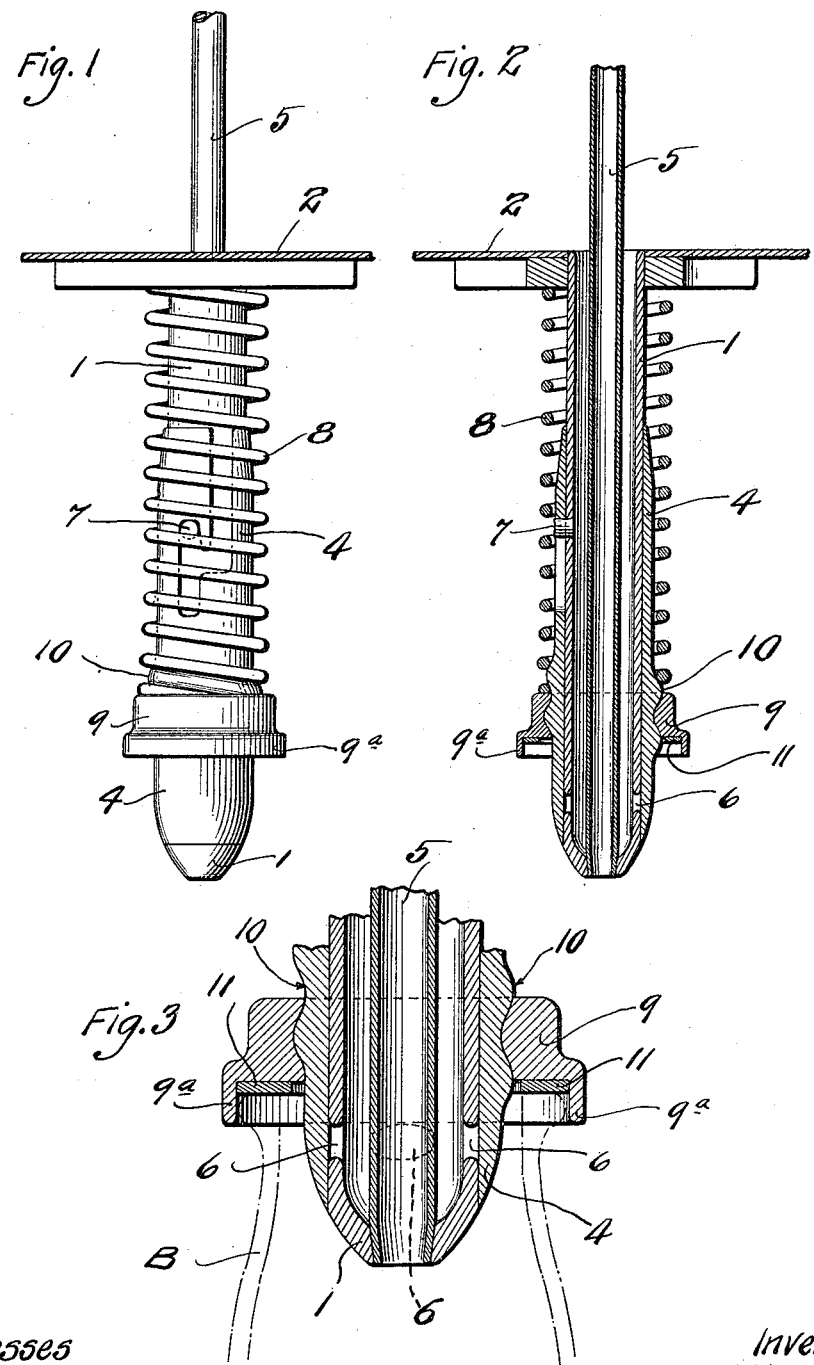

GEORGE W. HAVERSTICK AND THOMAS J. McKEE, OF ST. LOUIS, MISSOURI.

SANITARY FILLING-VALVE.

1,140,514.

Specification of Letters Patent. Patented May 25, 1915.

Application filed February 2, 1914. Serial No. 816,035.

*To all whom it may concern:*

Be it known that we, GEORGE W. HAVERSTICK and THOMAS J. McKEE, citizens of the United States, residing at the city of St. Louis, State of Missouri, have invented a certain new and useful Improvement in Sanitary Filling-Valves, of which the following is a full, clear, and exact description, such as will enable others skilled in the art to which it appertains to make and use the same, reference being had to the accompanying drawings, forming part of this specification, in which—

Figure 1 is an elevational view of our improved filling valve. Fig. 2 is a longitudinal section. Fig. 3 is a detail in section of the outlet end of the valve.

Our invention relates to valves and specifically to a form of valve designed specially for filling milk bottles.

The purpose of our invention is to provide a valve which is operable by the pressure of a milk bottle presented to it for filling, which valve has all of its details specially designed to be sanitary.

As it is well known in the art, the filling of milk bottles in large dairies is usually accomplished by the use of semi-automatic filling valves which are supplied from a tank to which they are attached, and which are operated by the pressure of the milk bottles when they are presented for filling. The importance of sanitary appliances in handling milk is universally recognized, and demands that all containers, conduits and valves with which the milk comes in contact be susceptible of quick and thorough cleansing. Cleansing of the semi-automatic filling valves is difficult, made so by the fact that gaskets, screw threads, floats and other elements which afford resting places for the liquid, are usually employed.

It is our principal object to form a filling valve which is devoid of all crevices, gaskets and other features which hold minute quantities of fluid and are difficult of access for cleansing.

With these and other objects in view it will be understood by reference to the drawings that our device includes a stationary tube 1, which communicates with the fluid container 2 and which supports a sliding member 4. The stationary member 1 is cast with a reduced lower end, which is provided with a central opening designed to receive the end of an air tube 5. The air tube is retained in the end of the stationary member 1 by simple friction contact, which forms a close joint. The opening in lower end of the tube 5 may be tapered to increase the tightness of the joint. The interior wall of the stationary member 1 tapers down gradually to the air tube opening. A short distance below its lower extremity the stationary member 1 is provided with a series of apertures 6, the edges of which are rounded, as is plainly shown in Fig. 3.

The slidable member 4 has a very close sliding contact with the outer wall of the stationary member 1, the same being so close as to form a water tight joint. The lower portion of slidable member 4 is rounded off to conform to the taper of the lower end of the stationary member 1, and this lower end of slidable member 4 is adapted to cover the apertures 6 thereby to close the same against the egress of liquid. Slidable member 4 is carried on stationary member 1 by means of a pin 7 mounted in the stationary member and a bayonet slot formed in the slidable member. A spring 8 tends to hold the slidable member 4 in its downward position. Said spring bearing at its upper end against any suitable member such as the container 2, and at its lower end against an adjustable collar 9, which is adjustably mounted on slidable member 4. The form of mounting for collar 9 consists in a smooth non-angular thread 10, formed on the outer face of slidable member 4, and a corresponding groove formed in the inner face of the collar 9. The collar 9 has an annular depending skirt portion $9^a$, which forms the seat for the mouth of a bottle B, when the latter is in position for filling. In the seat portion may be disposed a rubber gasket 11.

When it is desired to fill a bottle, the bottle is placed with its mouth encircling the lower ends of stationary member 1 and slidable member 4, the top of the bottle resting in the seat formed by the collar 9. Pressure upward on the bottle slides slidable member 4 upward against the tension of spring 8, uncovering the apertures 6 and permitting the flow of the fluid from the interior of stationary member 1 into the bottle. The air in the bottle escapes through the air tube 5. When the bottle is filled it is lowered, permitting spring 8 to move slidable member 4 downward and close the apertures 6.

The extent to which the bottle will be filled, may be regulated by the adjustment of collar 9 on thread 10. The farther down collar 9 is positioned on slidable member 4 the more nearly full will the bottle be filled.

This device forms a very sanitary valve as there are no crevices or square corners in any part to which the liquid has access. The milk does not have access to the interior of collar 9, for the reason that the bottles are never filled completely full. The thread 10 provides an easy means of adjustment for collar 9, yet being large and rounded it does not provide a crevice wherein the fluid can stick and dry. Furthermore the thread is very easily cleaned, which is not the case with screw threads.

The valve may be very easily taken apart by simply unshipping slidable member 4 from pin 7 as is permitted by the bayonet slot, and air tube 5 may be quickly removed by simply withdrawing it with a slight twist from stationary member 1. The stationary member 1 may then be flushed out and thoroughly cleaned, as it does not have any shoulders or crevices in which the liquid can stick. The slidable member 4 and air tube 5 can be likewise readily cleaned, or placed in a suitable cleansing solution.

From the foregoing it is obvious that our invention provides a very simple but efficient form of filling valve, which is capable of very quick assembling and disassembling, and thorough cleansing. Furthermore it is obvious that the valve is provided with means whereby the degree to which the bottles will be filled may be regulated.

What we claim is:

1. A filling valve comprising a stationary tubular member provided with a valve opening near its lower extremity, a slidable member mounted on said stationary member intermediate its extremities and adapted to form a closure for said valve opening, yielding pressure means impelling said slidable member to cover said valve opening, said stationary and slidable members being provided with retaining means disposed above the valve opening for retaining the latter upon the former, and said slidable member being removable over the lower end of said stationary member upon disengagement of the retaining means.

2. A filling valve comprising a stationary tubular member provided at its lower extremity with a valve opening and an air exhaust opening, a slidable member mounted on said stationary member and adapted to form a closure for said valve opening, said slidable member terminating short of said air exhaust opening, the slidable member being removable over the lower extremity of the stationary member, and said members being provided with retaining means disposed above the valve opening for retaining the slidable member on the stationary member.

In testimony whereof we hereunto affix our signatures in the presence of two witnesses, this thirty-first day of January, 1914.

GEORGE W. HAVERSTICK.
THOMAS J. McKEE.

Witnesses:
M. P. SMITH,
C. S. BUTLER.

Copies of this patent may be obtained for five cents each, by addressing the "Commissioner of Patents, Washington, D. C."